United States Patent [19]

Stolzer

[11] 3,789,717
[45] Feb. 5, 1974

[54] BANDSAW MACHINE
[75] Inventor: Paul Stolzer, Achen, Germany
[73] Assignee: Keuro Maschinenbau Gesellschaft mit beschrankter Haftung & Co., KG., Achen, Germany
[22] Filed: Nov. 28, 1972
[21] Appl. No.: 310,073

[30] Foreign Application Priority Data
Dec. 1, 1971 Germany............... P 21 59 580.2

[52] U.S. Cl. .................. 83/796, 83/454, 83/800, 83/820
[51] Int. Cl. .................. B23d 55/04, B23d 55/08
[58] Field of Search ..... 83/796, 799, 800, 820, 788, 83/454

[56] References Cited
UNITED STATES PATENTS
2,630,622  3/1953  Beck ................................. 83/796
3,575,074  4/1971  Aizawa et al. ................. 83/796
3,352,186  11/1967  Cleland ........................... 83/820

Primary Examiner—J. M. Meister
Attorney, Agent, or Firm—Spencer & Kaye

[57] ABSTRACT

A bandsaw machine with a base on which a workpiece table is mounted and a member pivotally mounted to the machine base. The base includes a pair of clamping jaws for the workpiece with the jaw closest to the pivotal mounting being adjustable and with the other jaw being fixed. The pivotally mounted member includes at least two reversibly driven pulleys, an endless saw band extending partially around and between the pulleys and a pair of guides for the saw band with the guide closest to the pivotal mounting being adjustable and with the other guide being fixed in the running direction of the saw band. Both guides are mounted to the pivotally mounted member so that in those instances where the plane of rotation of the reversibly driven pulleys is inclined to a feed plane defined by the pivotal movement of the pivotally mounted member, they will direct a portion of the saw band between the pulleys into the feed plane for cutting the workpiece. A control arrangement is provided for automatically and simultaneously adjusting both the adjustable clamping jaw and the adjustable guide.

12 Claims, 2 Drawing Figures 3,789,717

BANDSAW MACHINE

BACKGROUND OF THE INVENTION

The present invention relates to a bandsaw machine, and more particularly to a bandsaw machine having a machine base defining a workpiece surface on which a workpiece is received and retained by means of clamping jaws of which at least one is adjustable, and a machine member pivotally mounted on the machine base to define thereby a feed direction of an endless saw band. The saw band extends about at least two respectively driven pulleys which are mounted on the machine member in such a way that their plane of rotation is arranged perpendicularly or at some other inclination to the feed plane of the saw band. The saw band is held by means of guides supported on the pivotal machine member and lying on both sides of the workpiece in the region of the clamping jaws. At least one of these guides is adjustable in the running direction of the saw band, and both guides cause a portion of the saw band to be pivoted into the feed plane for cutting in the case where the plane of the reversible pulleys is inclined to the feed plane.

As a rule in such known bandsaw machines one of the reversibly driven pulleys is adjustably displaced with respect to the other, in order to adjust the tension in the saw band. In addition, the workpiece is securely clamped in place by means of a manual spindle operating the clamping jaws, with the guides for the saw band each being carried by the pivotable machine member and being displaceable and securable by means of a manually operable clamping screw on a rod. This arrangement is extraordinarily complicated and time-consuming, especially with workpieces of different cross-sections, since for every workpiece change in which a different cross-section is involved the spacing of the guides and the cutting pressure must be separately adjusted to the new cross-section in order that the output capacity of the bandsaw machine may be exploited fully.

A further disadvantage of the known bandsaw machine lies in the fact that the cutting force, which is independent on the weight of the pivotable machine member and its pivoted position, in at a minimum when the machine member is pivoted up and at a maximum when the machine member lies practically horizontal. This necessitates adjusting the cutting force to the approximately horizontal pivotal position of the machine member for maximum effectiveness, that is, the bandsaw machine cannot be fully exploited because it operates with a reduced cutting force in the other pivotal positions of the machine member.

SUMMARY OF THE INVENTION

It is an object of the present invention to improve the known bandsaw machines of the kind described so that the cutting conditions of the machine are optimized and the machine rendered easier to handle by automatically adjusting the cutting conditions. That is, because of the present invention the bandsaw machine operates automatically under optimal cutting conditions.

This as well as other objects are accomplished according to the present invention with a bandsaw machine of the kind described in that only the clamping jaw nearer to the pivot mounting of the machine member is adjustable, while the other clamping jaw is mounted to be stationary on the base portion of the machine, and in that the saw band guide aligned with the adjustable clamping jaw, that is, mounted nearer to the pivot mounting of the machine member, is adjustable automatically with the adjustable clamping jaw, while the other saw band guide is mounted to be stationary on the pivotable machine member.

The invention is based upon a recognition of the fact that optimum utilization of the machine can best be realized when the workpiece is clamped as far as possible from the pivot mounting of the machine member, so that the pivot angle through which the machine member travels to the workpiece, and thus the variance in the cutting force, which is dependent upon the pivotal position of the machine member, are reduced to a minimum.

Moreover, the independent adjustment of the guide with the adjustable clamping jaw has the effect that the saw band is always correctly guided with operating errors in this connection, which can lead to damage or even destruction of the saw band, being effectively precluded.

It has proved expedient to have the adjustable guide mounted on a carriage which in turn is mounted on a rail fastened to the pivotable machine member to be displaceable parallel with that portion of the saw band situated in the working region, that is, in the region of the workpiece.

According to the present invention the displaceable clamping jaw is displaceable by means of a double-acting hydraulic cylinder-piston unit, which acts on the one hand upon the machine base and on the other hand on the clamping jaw. One cylinder chamber of this hydraulic unit is connectable with a pressure medium source from which it is energized in order to clamp the workpiece, and with a return conduit for the pressure medium in order to release the workpiece. The adjustment of the movable guide is likewise effected by a double-acting hydraulic cylinder-piston unit, which acts on the one hand on the guide and on the other hand on the pivotable machine member. The cylinder chamber of this hydraulic unit which moves the guide in the clamping direction of the clamping jaw is connected with the other cylinder chamber of the hydraulic unit used to adjust the clamping jaw. The effective piston areas of these two cylinder chambers are of equal size. The other cylinder chamber of the guide hydraulic unit is connectable with the pressure medium source used for removal of the clamping jaw from the workpiece, so as to provide for simultaneous removal of the guide while it is constantly in communication through an adjustable throttle valve with a return flow conduit for the pressure medium.

According to a futher feature of the present invention, it has proved especially advantageous for cutting workpieces of larger cross-sections to provide an additional guide for the saw band, which is carried by the pivotable machine member centrally positioned between the previously mentioned guides. The additional guide is mounted so that it is automatically adjustable with the adjustment of the movable clamping jaw by one-half the amount of the adjustment of the movable guide in the direction of movement of the band saw. The additional guide is moreover mounted on the machine member in such a way that it is freely movable in a direction substantially perpendicular to the direction of movement of the saw band so that upon engaging the mounted workpiece the additional guide is lifted away from the saw band as the latter penetrates into the workpiece. The additional guide thus provides added support for the saw band for commencement of cutting of the workpiece, while however not interfering with the cutting operation, since when the saw band has penetrated into the workpiece, the additional guide engages the workpiece and is moved out of the cutting area.

The additional guide can likewise be displaceable on the rail to which the adjustable guide is mounted by means of a carriage on which the additional guide is mounted. A reversible roller for a traction means can be rotatably mounted on the displaceable additional guide carriage. The traction means is secured on the one hand to the rail and on the other hand to the adjustable guide carriage. The displaceable additional guide carriage can be in communication with a single-acting hydraulic cylinder-piston unit bearing on the pivotable machine member. The additional guide is then movable in the direction towards the stationary clamping jaw by this single-acting hydraulic unit, the cylinder chamber of which is constantly connected to the pressure medium source. This arrangement insures that the additional guide shifts with the movable guide, but remains midway between the movable guide and the fixed guide.

Further according to the present invention, the feed force imparted to the saw band by the pivotable machine member is capable of being kept constant in dependence upon the pivotable position of the machine member. This is accomplished by counter-balancing the weight of the machine member. The weight of the machine member is opposed by counter-balancing so that its effect is at a minumum when the machine member is pivoted up and at a maximum when the machine member lies approximately horizontally.

For this purpose, according to the invention, the feed of the saw band in the direction towards the workpiece and the cutting pressure generation are effected by a double-acting hydraulic cylinder-piston unit connected with a pressure medium source. The hydraulic unit is articulated on one end to the machine base and on the other end to the pivotal machine member. The cylinder chamber which serves to feed the saw band is connected through an adjustable throttle valve to the return flow conduit for the pressure medium and to a pressure medium source via a further valve which can be switched over to the return flow conduit. The other cylinder chamber of this hydraulic unit is also connected through an adjustable throttle valve to a return flow conduit, and the setting of this throttle valve takes place by a control cam, which is mounted on the machine base, in dependence upon the pivotal position of the machine member. The control is such that the throttle action is at a minimum when the machine member is pivoted up and at a maximum when the machine member lies approximately horizontally. This other cylinder chamber is also connectable to the pressure medium source to which the saw band feed cylinder is connected.

With this arrangement, any influence of the pivotal position of the pivotable machine member upon the magnitude of the cutting force is completely precluded, so that in this connection the bandsaw machine operates under optimal conditions.

With respect to the fact that the optimally applicable cutting force is also dependent upon the cross-section of the workpiece, a further advantageous development of the present invention provides for adjustment of the feed force transmitted to the saw band by the pivotable machine member to take place in dependence upon the position of the adjustable clamping jaw, the displaceable guide or the additional guide, in such a way that the feed force is less when the clamping jaws are driven apart and greater when the clamping jaws are driven together. Here an adjustment of the effect of the throttle valve connected with the cylinder chamber serving to feed the saw band can be effected by a control cam accompanying the movement of the adjustable clamping jaw, the displaceable guide or the additional guide, in such a way that the throttle effect is less when the clamping jaws are driven apart and greater when the clamping jaws are driven together. For the adjustment of the throttle effect in this case the throttle valve connected with the cylinder chamber serving to feed the saw band can be followed, following upon the return flow conduit, by a further adjustable throttle valve cooperating with the control cam.

This arrangement produces a bandsaw machine which permits the saw band to operate automatically and always under optimal conditions, so that the output capacity of the bandsaw machine can be exploited without any limitation. Because of the automatic operation trained personnel are not necessary for the operation of the bandsaw machine according to the present invention.

DESCRIPTION OF THE PREFERRED EMBODIMENTS

Figure 1:
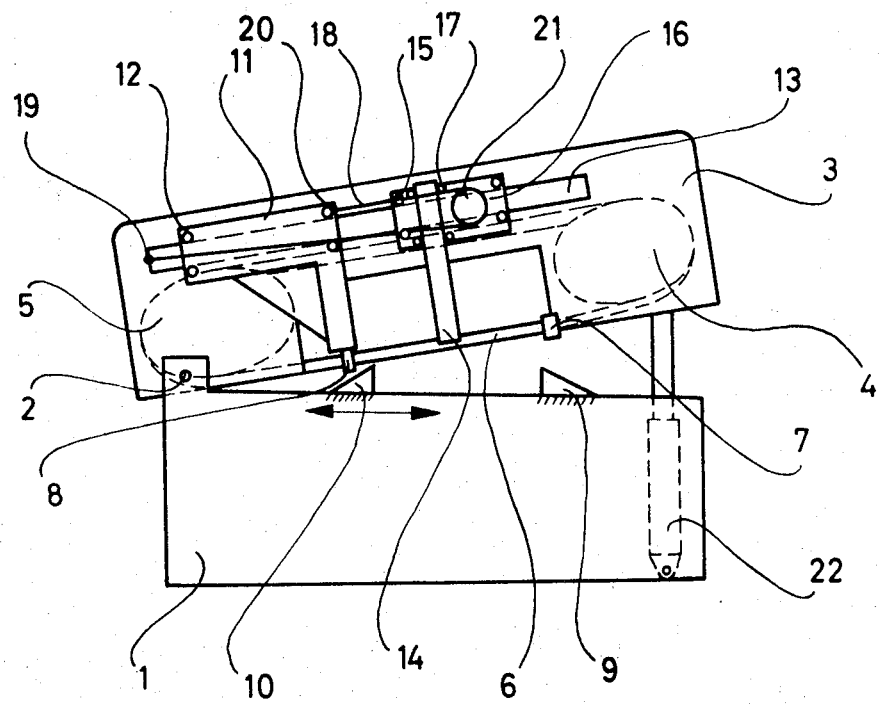
FIG. 1 is a schematic illustration of a front elevational view of a bandsaw machine according to the invention.

The bandsaw machine illustrated in FIG. 1 includes a machine base or pedestal 1 to which a machine member 3 is pivoted by a pivot mounting 2. The machine member 3 has two reversible driven pulleys 4 and 5 mounted therein around and between which an endless saw band is moved.

A portion of the saw band 6 defines a cutting plane which lies parallel with the plane of the drawing in FIG. 1, and coincides with a feed plane defined by the pivoting of the machine member 3, while the reversibly driven pulleys 4 and 5 rotate in a plane which is either perpendicular or inclined at some other angle to the cutting plane. In order to pivot the saw band 6 into the cutting plane and at the same time to guide and support it, two guides 7 and 8 mounted on the machine member 3 are provided, with the guide 7, i.e., the guide farthest from the pivot mounting 2, being fixedly mounted on the machine member 3 while the guide 8, i.e., the guide closer to the pivot mounting 2, is mounted to be displaceable in order to adapt the saw band 6 to the particular cross-section of the workpiece to be worked. The bandsaw is provided with a pair of clamping jaws 9 and 10. These jaws are moumted on the base 1. The jaw 9 which is aligned with the guide 7 is fixedly mounted on the base 1, while the clamping jaw 10 which is aligned with guide 8 is displaceably mounted on the base 1 in a conventional manner.

To effect the displacement of the guide 8 in the direction of movement of the sawband 6, it is mounted on a carriage 11, which in turn is displaceably mounted by means of rollers 12 or the like on a rail 13 whcih is carried by the machine member 3.

An additional guide 14 for the saw band 6 is provided for acting upon the saw band 6 centrally thereof between the two guides 7 and 8. The additional guide 14 is arranged on a carriage 16 which is likewise displaceable on the rail 13 by means of, for example, rollers 15. The guide 14 can be displaced on the carriage 16, for example, by means of rollers 17, away from the saw band 6 in a direction perpendicular to the rail 13. This latter displacement takes place, according to the embodiment illustrated in FIG. 1, when the saw band 6 penetrates into a workpiece (not shown). The additional guide 14 then engages the workpiece and stops its advancement in the feed direction of the saw band 6 while the member 3 continues to move relative to the guide 14.

In order to retain the additional guide 14 always midway between the guides 7 and 8 even when the guide 8 is adjusted, the carriage 16 is charged with constantly applied force, in a manner to be explained hereinafter, which seeks to displace the carriage 16 in the direction towards the stationary guide 7. However, the carriage 16 is held fast against the action of this force by a traction member, e.g., a wire 18, which is secured at one end 19 to the rail 13 and at its other end 20 to the carriage 11, and which runs around a reversing roller 21 which is rotatably mounted on the carriage 16, and also by the force effected on the carriage 11 by a double-acting hydraulic unit, to be described more fully hereinafter. Thus with every movement of the carriage 11 there occurs a similarly directed movement of the carriage 16 and thus of the additional guide 14. However, the movement of the guide 14 is only one-half that of the carriage 16.

Finally from FIG. 1 there is shown a cylinder-piston unit 22 which is articulated at one end to the machine base 1 and at the other end (not shown) to the machine member 3. The unit 22 generates the forces necessary to pivotally move the machine member 3, to cause the saw band 6 to exert the necessary cutting force upon the workpiece, and to counter-balance the weight of the member 3.

Figure 2:
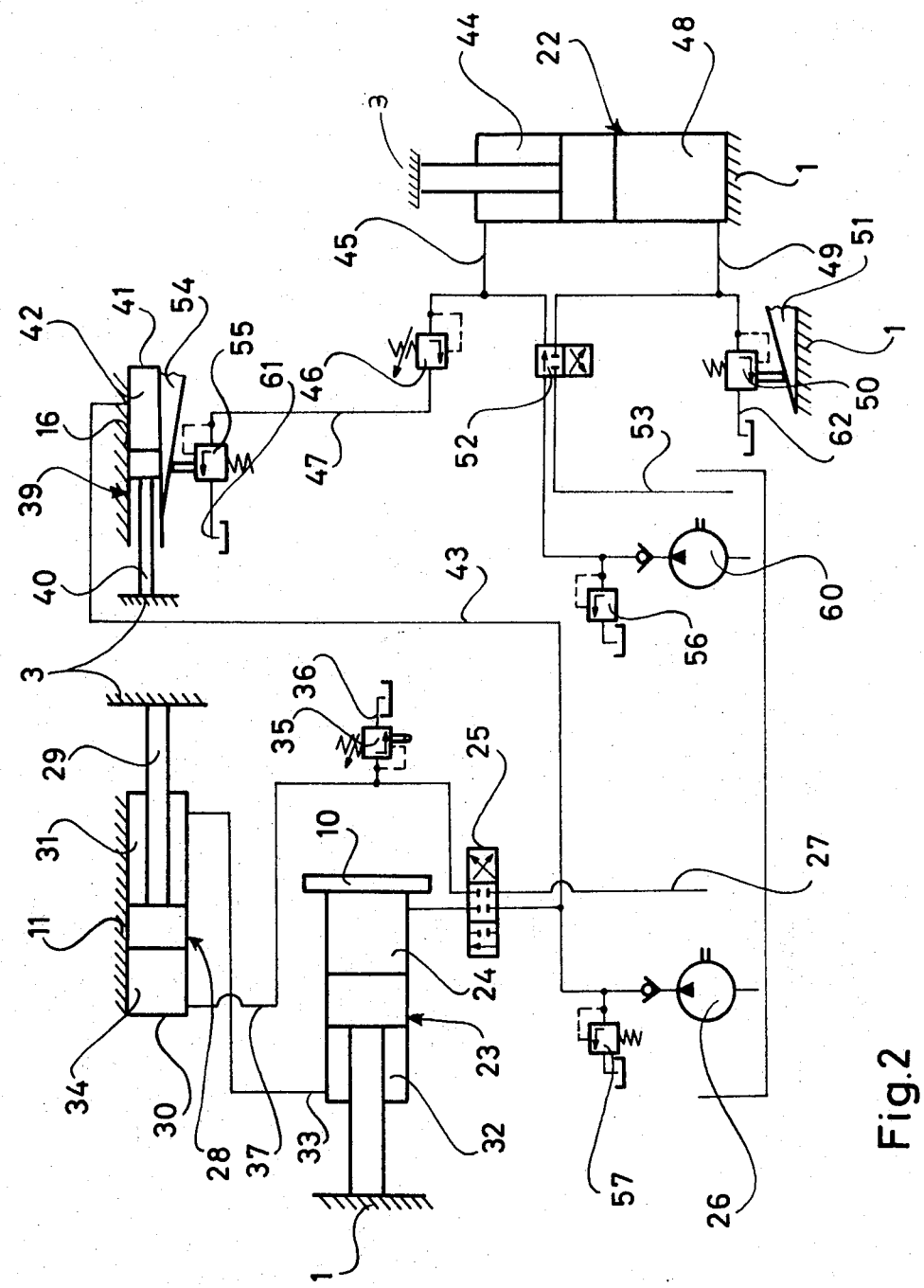
FIG. 2 is a diagrammatic representation of the hydraulic circuit for automatic operation of the bandsaw machine according to FIG. 1.

Further details of the bandsaw machine according to FIG. 1 will be exaplained hereinafter with reference to FIG. 2. From FIG. 2 it may be seen that the displacement of the clamping jaw 10 and thus the clamping and release of the workpiece are effected by a double-acting hydraulic cylinder-piston unit 23. The unit 23 is supported on the machine base 1. For this purpose the cylinder chamber 24 of the hydraulic unit 23 is connectable by means of a control slide valve 25 either with a pressure medium source 26 or with a return flow conduit 27 for the pressure medium. With the control slide valve 25 in its middle position as shown in FIG. 2, the clamping jaw 10 is held fast in either the clamping or released positions.

A futher double-acting hydraulic cylinder-piston unit 28 is secured with its piston rod 29 to the pivotal machine member 3, while its cylinder 30 is connected with the carriage 11 of the displaceable guide 8, so that the guide 8 can be moved together with the clamping jaw 10 during clamping of the workpiece. Thy cylinder chamber 31 of the hydraulic unit 28 is connected with the cylinder chamber 32 of the hydraulic unit 23 through a conduit 33, so that the pressure medium displaced from the cylinder chamber 32 during clamping of the workpiece enters the cylinder chamber 31 and thus effects a displacement of the cylinder 30 and thus of the guide 8. As a result of this movement the pressure medium contained in the cylinder chamber 34 of the hydraulic unit 28 is discharged therefrom through a conduit 37 and an adjustable throttle valve 35 into a return flow conduit 36.

To release the workpiece from the jaws 9 and 10, the cylinder chamber 34 of the hydraulic unit 28 is connected through the control slide valve 25 and the conduit 37 with the pressure medium source 26, while the cylinder chamber 24 of the hydraulic unit 23 is connected at the same time by the control slide valve 25 with the return flow conduit 27 for the presssure medium. As a result, the cylinder chamber 34 is charged with pressure medium while a corresponding quantity of pressure medium is transferred from the cylinder chamber 31 into the cylinder chamber 32 and a further corresponding quantity of the pressure medium is conducted from the cylinder chamber 24 into the return flow conduit 27, whereby both the guide 8 attached to the cylinder 30 and the clamping jaw 10 are moved to the left as viewed in FIGS. 1 and 2.

It should also be mentioned that the effective piston areas in the cylinder chambers 31 and 32 must be of equal size, so that the guide 8 and the clamping jaw 10 are moved in each case by equal amounts in both directions.

As may be seen from FIG. 2, the additional guide 14 is provided with a single-acting hydraulic cylinder-piston unit 39. The unit 39 includes a piston rod 40 which is connected to the machine member 3 and a cylinder 41 which is connected to the carriage 16. The hydraulic unit 39 is arranged to have its cylinder chamber 42 connected by means of a conduit 43 with the pressure medium source 26. As a result of this connection, a constantly applied force is exerted against the carriage 16. This force tends to move the carriage 16 away from the carriage 11 of the movable guide 8, and is reacted in the manner described above with reference to FIG. 1.

In FIG. 2 there is further illustrated the double-acting hydraulic cylinder-piston unit 22. One end of the unit 22 is connected to the machine base 1 and the other end is connected to the machine member 3. In order to generate the desired cutting force for the saw band 6, the cylinder chamber 44 is charged through a conduit 45 and a controllable slide valve 52 with a pressure medium from a pressure source 60. The result is a downward movement of the machine member 3. The cutting force can be adjusted in relation to the material to be worked by an adjustable throttle valve 46 through which the pressure medium can be diverted through a conduit 47 connected to a return flow conduit 61.

The cylinder chamber 48 of the hydraulic unit 22 is in communication through a conduit 49 in which an adjustable throttle valve 50 is placed with a return flow conduit 62. Adjustment of the valve 50 takes place in dependence upon the pivotal position of the machine member 3, by means of a control cam 51 which is mounted on the machine base 1. The pressure in the chamber 48 partially supports the weight of the pivotable machine member 3.

In operation, the piston of the hydraulic unit 22 and thus the pivotable machine member 3 are moved in the feed direction of the saw band 6 by the hydraulic pressure adjustably imparted by means of the throttle valve 46 to the cylinder chamber 44 and against the pressure prevailing in the cylinder chamber 48. By means of the control cam 51 and the throttle valve 50 cooperating therewith, the counter-pressure prevailing in the cylinder chamber 48 is varied so that the variation of the weight force which the pivotable machine member 3 exerts upon the saw band 6 can be compensated for or even elininated.

In order to lift the machine member 3 after the saw band 6 has cut through the workpiece, the cylinder chamber 48 can be connected by means of the control slide valve 52 to the pressure medium source 60 and the cylinder chamber 44 connected to the return flow conduit 53.

As is known the maximum cutting force which may be exerted upon the workpiece by the saw band 6 is dependent upon the cross-section of the workpiece. In order to account for the cross-section of the workpiece, the carriage 16 and the cylinder 41 connected therewith are equipped with a control cam 54 by which an adjustable throttle valve 55, which is connected with the conduit 47, is adjusted. In this way an additional and adjustable throttling of the pressure medium flowing through the valve 46 occurs in such a way that the cutting force exerted by the saw band 6 is less in the case of workpieces with large cross-sections and the corresponding setting of the carriage 16 than in the case of workpieces with small cross-sections. Of course, it is possible to combine the throttle valves 46 and 55 into a single valve. The basic setting of this throttle valve, with regard to the material to be worked, can be set by varying the length of the effective connection of this valve with the control cam 54. It is also possible and advantageous, for reasons of design, to mount the control cam 54 on the carriage 11, the cylinder 30 or on the clamping jaw 10.

Finally, adjustable throttle valves 56 and 57 are provided. These are arranged on the delivery side of the pressure medium sources 26 and 60 and serve to limit the pressure of the pressure medium.

It will be understood that the above description of the present invention is susceptible to various modifications, changes and adaptations, and the same are intended to be comprehended within the meaning and range of equivalents of the appended claims.

I claim:

1. In a bandsaw machine including a machine base having a workpiece table for the reception of a workpiece, a pair of clamping jaws, at least one of which is adjustable for clamping the workpiece to the workpiece table, and a machine member having mounted thereon an endless saw band, at least two reversibly driven pulleys partially around aand between which the endless saw band moves, and a pair of guides for the saw band, the machine member being pivotally mounted to the machine base to thereby define in its pivotal movement a feed plane for the saw band, with the plane of rotation of the reversibly driven pulleys having a predetermined inclination to the feed plane of the saw band, with the pair of guides lying one on each side of the workpiece in the region of the clamping jaws and being arranged to direct the portion of the saw band between the guides into the feed plane for cutting, and with at least one guide being adjustable in the moving direction of the saw band, the improvement comprising; the one of said clamping jaws and the one of said guides which are closest to said pivotal mounting of said machine member being adjustable, and the other of said clamping jaws and the other of said guides which are farthest from said pivotal mounting being fixedly mounted on said machine base and said machine member, respectively; and means for automatically and simultaneously adjusting said adjustable clamping jaw and said adjustable guide.

2. A bandsaw machine as defined in claim 1, wherein said adjusting means includes first and second double-acting hydraulic cylinder-piston units each having first and second cylinder chambers, said first of said hydraulic units having a first relatively moveable portion thereof connected to said machine base and the other relatively moveable portion thereof connected to said adjustable clamping jaw, and said second of said hydraulic units having one relatively moveable portion thereof connected to the pivotable machine member and the other relatively moveable portion thereof connected to said adjustable guide, valve means for selectively connecting said first cylinder chamber of said first hydraulic unit to a pressure medium source or to a return flow conduit for the pressure medium, for clamping and releasing the workpiece respectively, said first cylinder chamber of said second hydraulic unit, which chamber causes movement of the adjustable guide in the clamping direction of said adjustable clamping jaw, being connected to said second cylinder chamber of said first hydraulic unit, the effective piston areas of said first cylinder chamber of said second hydraulic unit and said second cylinder chamber of said first hydraulic unit being substantially equal, said valve means further selectively connecting said second cylinder chamber of said second hydraulic unit with said pressure medium source from which is it charged with a pressure medium for the removal of the guide in the direction away from the workpiece and for the simultaneous removal of the clamping jaw from the workpiece, said second chamber of said second hydraulic unit being in constant communication with a return-flow conduit for the pressure medium through and adjustable throttle valve.

3. A bandsaw machine as defined in claim 2, further comprising a first carriage on which said adjustable guide is mounted, and a rail member mounted on said pivotable member on which said carriage is adjustably mounted; and wherein said other relatively moveable portion of said second hydraulic unit is connected to said carriage.

4. A bandsaw machine as defined in claim 1, further comprising an additional guide for said saw band, said additional guide being mounted on said pivotable machine member centrally between the pair of guides, means for automatically displacing said additional guide in the same direction of the displacemnt of said adjustable guide so that the displacement of said additional guide is half the displacement of said moveable guide; and means for mounting said additional guide on said pivotable machine member so that it engages the workpiece and is displaceable away from the saw band as the saw band cuts into the workpiece.

5. A bandsaw machine as defined in claim 4, further comprising a second carriage on which said additional guide is mounted, with said second carriage being displaceably mounted on said rail; and wherein said means for automatically displacing said additional guide includes a roller rotatably mounted on said second carriage, traction means having two end portions, with one end portion being secured to said rail and the other end portion being secured to said first carriage, and a single-acting hydraulic cylinder-piston unit, said single-acting unit being supported on said pivotable machine member and in operative engagement with said additional adjustable guide, said single-acting unit includes a cylinder chamber which is constantly charged through a conduit with a pressure medium from the pressure medium source, to thereby generate a biasing force which biases said second carriage in a direction toward said fixed jaw.

6. A bandsaw machine as defined in claim 2, further comprisng means for compensating for the weight of the pivotable machine member in its various pivotal positions, so that the cutting force imparted to the saw band is unaffected by said various pivotal positions of the machine member, the compensation being at a minimum when said pivotable machine member is pivoted to its upper limit and at a maximum when said pivotable machine member lies approximately horizontally.

7. A bandsaw machine as defined in claim 6, further comprising a third double-acting hydraulic cylinder-piston unit which is pivotally connected at one end to the machine base and at the other end to the pivotable machine member, said third hydraulic unit being arranged to effect pivoting of said pivotable machine member, to generate the cutting force imparted through said pivotable machine member to said saw band, and to generate a force for effecting said compensation, said third hydraulic unit including a first cylinder chamber within which the feed force is generated and a second cylinder chamber within which the compensating force is generated; a further pressure medium source; a feed conduit connected to said further pressure medium source; a first return flow conduit; valve means connected to said feed and first return flow conduits; a second return flow conduit; a first adjustable throttle valve means, said first cylinder being selectively connected by said valve means to either said feed conduit or said first return flow conduit, and through said first adjustable throttle valve means to said second return flow conduit; a third return flow conduit; a second adjustable throttle valve means; and cam means mounted on the machine base, said second cylinder chamber being connected through said second adjustable throttle valve means to said third return flow conduit and by said valve means to said feed conduit, said cam means controlling the throttle setting of said second adjustable throttle valve means in dependence upon the pivoted position of said pivotable machine member, such that the throttle e effect is a minimum when said pivotable machine member is pivoted to its upper limit and at a maximum when said pivotable machine member lies approximately horizontally.

8. A bandsaw machine as defined in claim 7, further comprising means for effecting an adjustment of the feed force transmitted to said saw band through said pivotable machine member in dependence upon the position of said adjustable clamping jaw relative to said fixed clamping jaw such that the feed force is progressively decreased as said clamping jaws are moved apart and progressively increased as said clamping jaws are moved together.

9. A bandsaw machine as defined in claim 8, wherein said feed force adjustment means includes a control cam means mounted on said bandsaw machine for movement with said clamping jaw, said cam means engaging said first adjustable throttle valve means in a manner such that the throttle action is progressively reduced as said clamping jaws are moved apart, and progressively increased as said clamping jaws are moved together.

10. A bandsaw machine as defined in claim 9, wherein said first adjustable throttle valve means includes two throttle valves both connected in series in said second return flow conduit, said control cam means engaging the one of said throttle valves furthest from said third hydraulic unit in a manner such that the throttle action is progressively reduced as said clamping jaws are moved apart, and progressively increased as said clamping jaws are moved together.

11. A bandsaw machine as defined in claim 9, further comprising an additional guide for said saw band, said additional guide being displaceably mounted on said pivotable machine member centrally between the pair of guides, means for automatically displacing said additional guide in the same direction of the displacement of said adjustable guide so that the displacement of said additional guide is half the displacement of said moveable guide; and means for mounting said additional guide on aid pivotable machine member so that it engages the workpiece and is displaceable away from the saw band as the saw band cuts into the workpiece, wherein said cam means is mounted on said additional guide for movement therewith in the direction of movement of said adjustable clamping jaw.

12. A bandsaw machine as defined in claim 10, further comprising an additional guide for said saw band, said additional guide being displaceably mounted on said pivotable machine member centrally between the pair of guides, means for automatically displacing said additional guide in the same direction of the displacement of said adjustable guide so that the displacement of said additional guide is half the displacement of said moveable guide; and means for mounting said additional guide on said pivotable machine member so that it engages the workpiece and is displaceable away from the saw band as the saw band cuts into the workpiece; and wherein said control cam means is mounted on said additional guide for movement therewith in the direction of movement of said adjustable clamping jaw.

* * * * *